United States Patent [19]

Gammarino

[11] Patent Number: 5,311,019
[45] Date of Patent: May 10, 1994

[54] PYROELECTRIC HYBRIDIZED LONG-WAVE INFRARED LASER RADIATION DETECTOR ASSEMBLY

[75] Inventor: Rudolph R. Gammarino, Pasadena, Calif.

[73] Assignee: Loral Electro-Optical Systems, Inc., Pasadena, Calif.

[21] Appl. No.: 868,677

[22] Filed: Apr. 14, 1992

[51] Int. Cl.$^5$ .................................. G01J 5/00
[52] U.S. Cl. .................................. 250/338.3
[58] Field of Search ............... 250/338.3; 434/22

[56]         References Cited
     U.S. PATENT DOCUMENTS

| H218      | 2/1987 | Marshall et al. | 434/22    |
| 4,808,822 | 2/1989 | Manning et al.  | 250/332   |
| 5,122,666 | 6/1992 | Turnbull        | 250/338.3 |

FOREIGN PATENT DOCUMENTS 1-111299 4/1989 Japan ................... 250/338.3

OTHER PUBLICATIONS

Henry P. Beerman, "Investigation of Pyroelectric Material Characteristics of Improved Infrared Detector Performance." *Infrared Physics*, vol. 15, No. 3 (Sep. 1975) pp. 225-231.

Robert J. Phelan, Jr., Clark A. Hamilton and Gordon W. Day, "Radiometry without Standard Sources/Electrically Calibrated Pyroelectrics." *Conference: Proceedings of the Society of Photo–Optical Instrumentation Engineers*, vol. 62 *Modern Utilization of Infrared Technology Civilian and Military*. San Diego, California US (19-20 Aug. 1975).

L. S. Kremenchugskii, A. F. Mal'nev, V. M. Stolyarov and A. Ya. Shul'ga, "Instrument for the Study of Laser Radiation." Translated from *Pribory i Teknika Eksperimenta*, No. 4 (Jul.-Aug. 1969) pp. 167-169.

*Primary Examiner*—Constantine Hannaher
*Attorney, Agent, or Firm*—Small Larkin & Kidde

[57]              ABSTRACT

A pyroelectric detector assembly for detection of 10.6 μm infrared laser radiation which has a thin film detector element fabricated from thin film lithium tantalate (LiTaO$_3$) coated with black gold, and an ultra low noise charge coupled preamplifier optimized for lithium tantalate. A postamplifier includes a low pass filter, voltage comparator, threshold adjustment, and pulse generator.

17 Claims, 3 Drawing Sheets

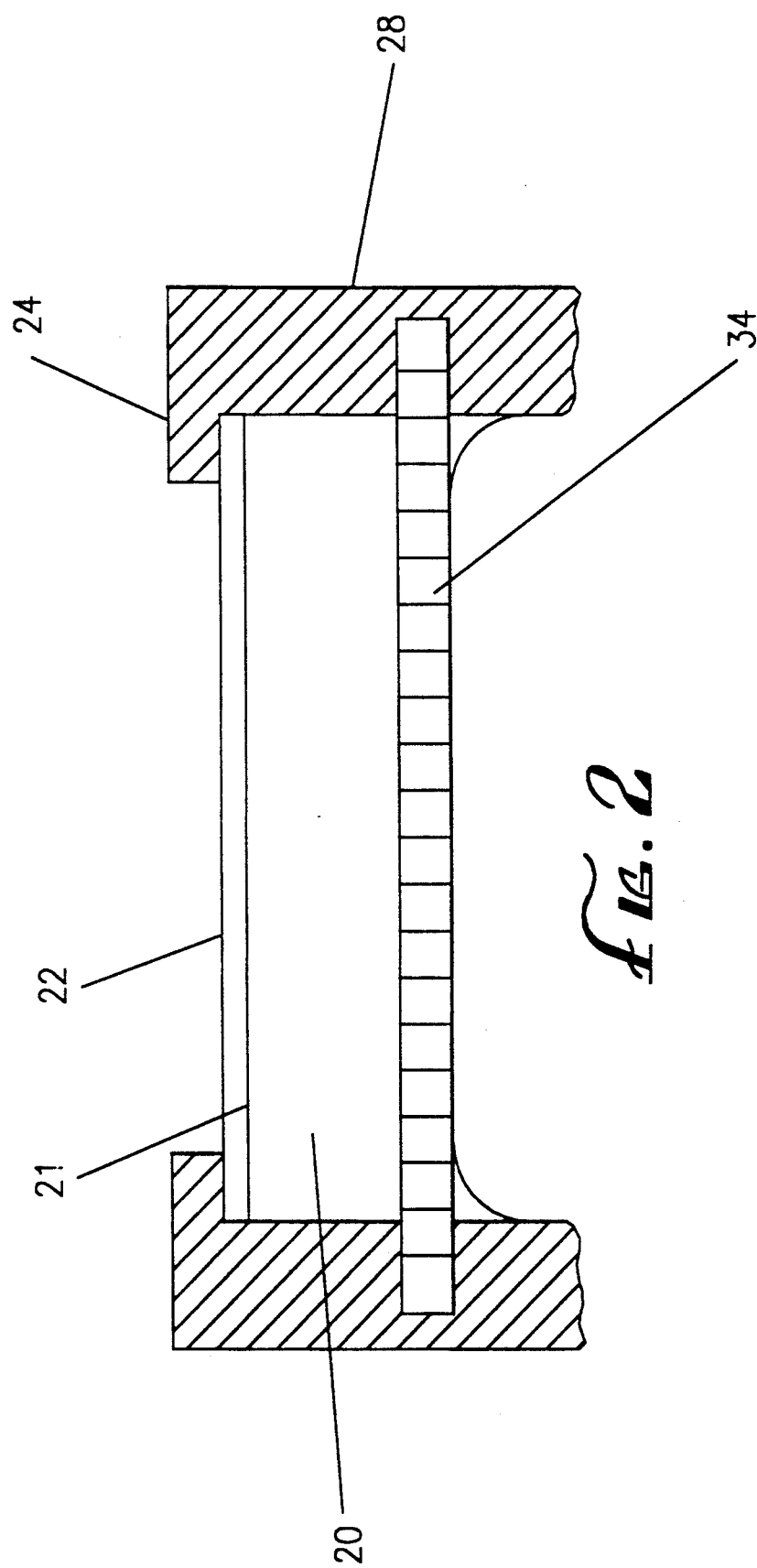

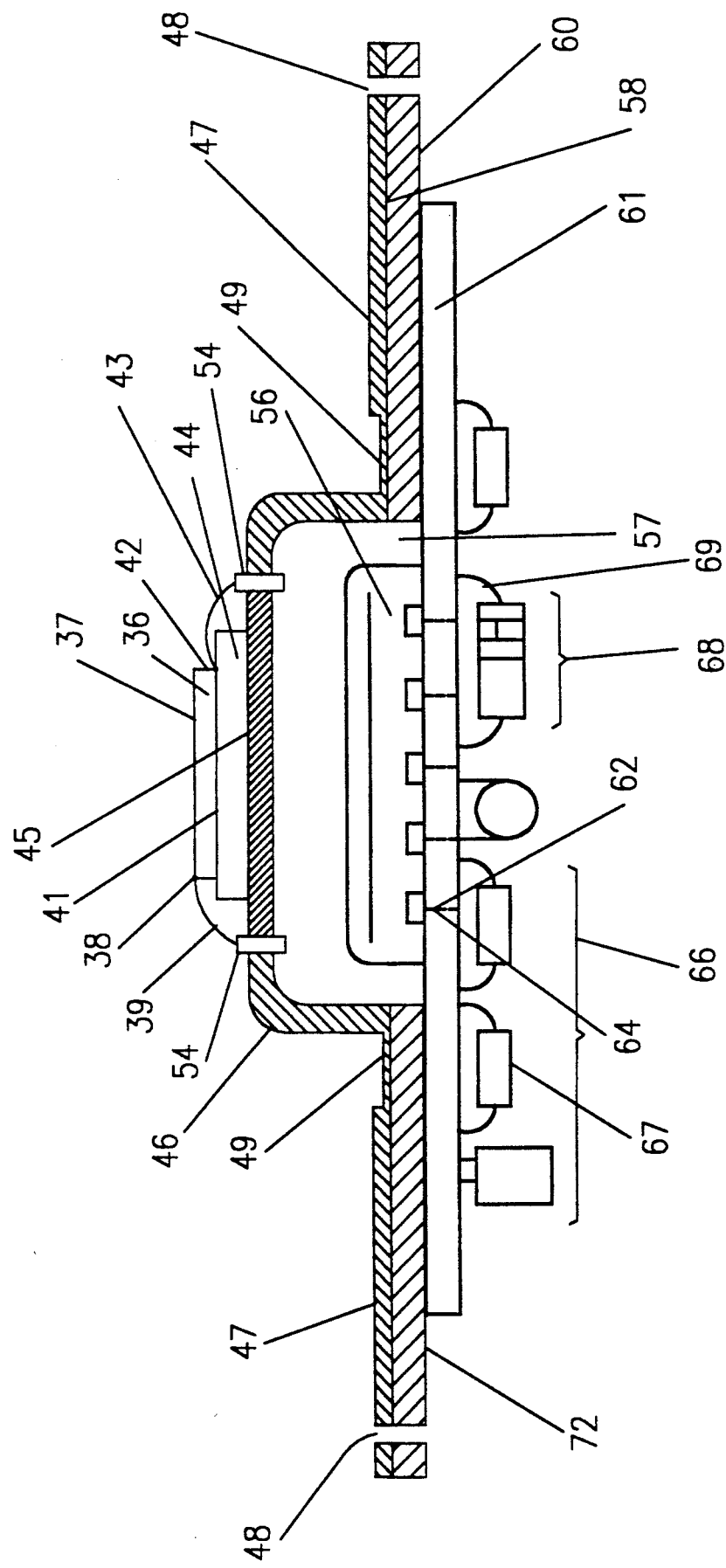

PYROELECTRIC HYBRIDIZED LONG-WAVE INFRARED LASER RADIATION DETECTOR ASSEMBLY

BACKGROUND OF THE INVENTION

1. Field of the Invention

This invention was made with Government support under Contract N61339-89-C-0068 awarded by U.S. Naval Training Systems Center, Orlando, Fla. The Government has certain rights in this invention.

This invention relates to pyroelectric detector units for incorporation into non-cooled receivers for use in tactical training systems, tactical warning systems, semi-active targeting systems, and low frequency optical communications systems, utilizing long-wave infrared (LWIR) lasers.

Laser training systems have been developed for simulating the lethality and realism of the modern tactical battlefield without actually firing live ammunition. The Multiple Integrated Laser Engagement System (MILES) uses semiconductor laser transmitters, capable of shooting pulses of coded infrared (IR) energy, attached to hand-carried and vehicle-mounted direct fire weapons. Signals registered in response to coded laser pulses impinging on detectors located on targeted troops and vehicles are instantaneously interpreted by MILES decoders to determine whether targets have been killed or damaged.

The laser beam generating semiconductors used heretofore in MILES transmitters have entailed two operational problems, due to their emission at wavelengths close to the human eye's response, viz., 0.4 $\mu$m to 0.7 $\mu$m. Firstly, output power must be minimal to mitigate against laser radiation damaging combatants' eyes. This constraint has resulted in shorter laser beam propagation ranges than could otherwise be conveniently achieved. Secondly, a gunner using MILES in a training exercise in a battlefield obscured by dust, smoke and fog-oil is unable to shoot what he can see through his forward-looking infrared (FLIR) acquisition sensor system. This is because particulate scattering of light increases with decreasing wavelength. Consequently, FLIR, which typically operates in the 8–12 $\mu$m spectral band, can image targets under conditions which preclude the transmission of standard MILES laser radiation whose wavelength is an order of magnitude shorter.

Both problems can be obviated by using a LWIR laser. The Shoot Through Obscuration MILES (STOM) is being developed to operate with FLIR during battlefield exercises. STOM employs a carbon dioxide ($CO_2$) laser which emits at 10.6 $\mu$m, the center of the FLIR spectral window. The STOM laser receiver system which detects and decodes laser beam hits includes two major components: one or more pyroelectric detector modules; and a decoder box. The present invention is a pyroelectric detector assembly (PDA), contained within a detector module housing.

2. Description of the Related Art

Pyroelectric detectors are thermal devices with an optical response determined by the absorption properties of the material of and/or by a coating applied to the receiving surface. An output current is produced whenever the receiving surface changes in temperature. Thus, the detector is inherently AC-coupled to the background, responding only to changes in IR energy.

Pyroelectric detectors have been developed to meet the specifications of low-cost, shock-resistant, high-reliability detectors required for "smart munitions", devices that seek, locate and guide themselves to their targets. The principal technology development areas have been: detector materials; signal amplifier electronics; and packaging able to withstand acceleration, shock and vibration.

The leading materials for detector construction are triglycine sulfate (TGS), lithium tantalate ($LiTaO_3$), lead zirconate titanate (PZT), and polyvinylidene fluoride (PVDF).

Because the detectors behave like capacitors with a very large impedance and low signal levels, the design of the amplifier coupling the pyroelectric element to the outside world is critical. Two techniques for amplification are currently used, voltage mode and current mode. In the voltage mode scheme, the output signal or current from the pyroelectric element produces a voltage across the buffer amplifier's input resistor. This high-impedance-level signal is transformed with a field effect transistor (FET) source follower into a signal with a more usable low impedance. The current mode amplification scheme uses an operational amplifier connected as a current-to-voltage converter where the current gain or output voltage is determined by the impedance of the feedback loop.

Pyroelectric detector assembly electronics are typically assembled using surface mounted devices (SMD) on ceramic substrates with thin or thick film conductors, eliminating the need for wire bonds which tend to fail under high-g stress. Since the devices and the integral electronics do not require cooling, the packaging does not have to be evacuated or backfilled with a low thermal mass gas. Packaging reliability is thus increased and cost reduced, compared to cooled detectors.

Receivers incorporating pyroelectric detectors have been developed which measure laser output power but, until the present invention, no such receiver for detecting the very low power radiation characteristic of laser tactical training systems has been available. Moreover, known pyroelectric receivers have not included electronic filtering nor have they exhibited extended high frequency response.

OBJECTS OF THE INVENTION

Accordingly, a principal object of the present invention is to provide a highly sensitive pyroelectric detector assembly suitable for the receivers of LWIR laser tactical training systems, specifically $CO_2$ laser training systems, capable of operating in obscured battlefield environments at ranges greater than 6 kilometers.

A further object of the invention is to provide a pyroelectric detector assembly suitable for the receivers of LWIR laser tactical training systems, specifically $CO_2$ laser training systems, capable of operating in concert with FLIR systems.

A further object of the invention is to provide a pyroelectric detector assembly suitable for the receivers of laser tactical training systems which do not pose a threat to combatants' eyes.

A further object of the invention is to provide a pyroelectric detector assembly having an improved lower minimum detectable power capability.

A further object of the invention is to provide a pyroelectric detector assembly enabling detector modules to be smaller in size than those heretofore constructed.

A further object of the invention is to provide a pyroelectric detector assembly enabling detector modules to be similar in cost than those of comparable sensitivity in the visible spectral regime.

A further object of the invention is to provide a pyroelectric detector assembly which consumes similar power as those of comparable performance in the visible spectral regime.

SUMMARY OF THE INVENTION

The inadequacies of the prior art have been resolved by the present invention which is a pyroelectric detector assembly comprising the following combination of serially contiguous elements: a metallic enclosure including a top cover and cylindrical shell impervious to electromagnetic interference (EMI) from radiofrequency (RF) sources, the top cover containing an antireflection coated germanium window; a milled chemically etched EMI shield; a pyroelectric thin film detector element, optimized for 10.6 $\mu m$ laser radiation, mounted on a ceramic substrate; an ultra low noise charge coupled preamplifier in close proximity to the detector element; a signal conditioner and a postamplifier including a comparator threshold circuit and pulse generator, all mounted on a printed circuit (PC) board; a power and signal shielded cable; and a metallic plate containing a channel for the cable which also serves as a back EMI shield.

The anti-reflection coated germanium window in the top cover acts as an optical filter, reducing the amount of solar energy irradiating the detector element. The milled chemically etched EMI shield is disposed below the optical filter and contacts a cylindrical metallic shell enclosing the PDA elements. The pyroelectric thin film detector element is cemented on a ceramic substrate mounted on a circular plate disposed below the EMI shield. The ultra low noise charge coupled hybridized preamplifier is mounted on the top surface of a circular plate disposed below the plate supporting the detector element, in close proximity to the detector element. Conductive contacts on the top and bottom surfaces of the detector element are electrically connected to the preamplifier by wires attached to electrically insulated pins in the printed circuit board mounted on the bottom surface of the circular plate, to which wires from the preamplifier package are also attached. The printed circuit board contains electronic filtering circuits and the postamplifier. Electrical power is supplied to the PDA through the shielded cable which is disposed in a channel on the upper surface of the metallic plate used as the back EMI shield. The mounting and housing components are riveted together to form the pyroelectric detector assembly. The PDA diameter is approximately 1.5 inches; the overall height is approximately 0.75 inch.

When laser radiation of sufficient power is incident on the detector element, a current is created which is first amplified by the low noise charge coupled preamplifier, then conditioned by the filtering circuits, and passed to the postamplifier which generates a pulse upon detection by its threshold circuit. The PDA outputs the resulting digital signal to the decoder via the shielded cable. Prior to final assembly, the threshold is adjusted to ensure that the false alarm rate is less than that required for system performance.

A complete understanding of the present invention and other objects, aspects and advantages thereof will be gained from a consideration of the following description of the preferred embodiment read in conjunction with the accompanying drawings provided herein.

BRIEF DESCRIPTION OF THE DRAWINGS

FIG. 2 is a sectional view of the top cover, window, and EMI shield.

FIG. 3 is a sectional view of the detector element, mount, electronics mounting plate, and printed circuit board.

DESCRIPTION OF THE PREFERRED EMBODIMENT

Figure 1:
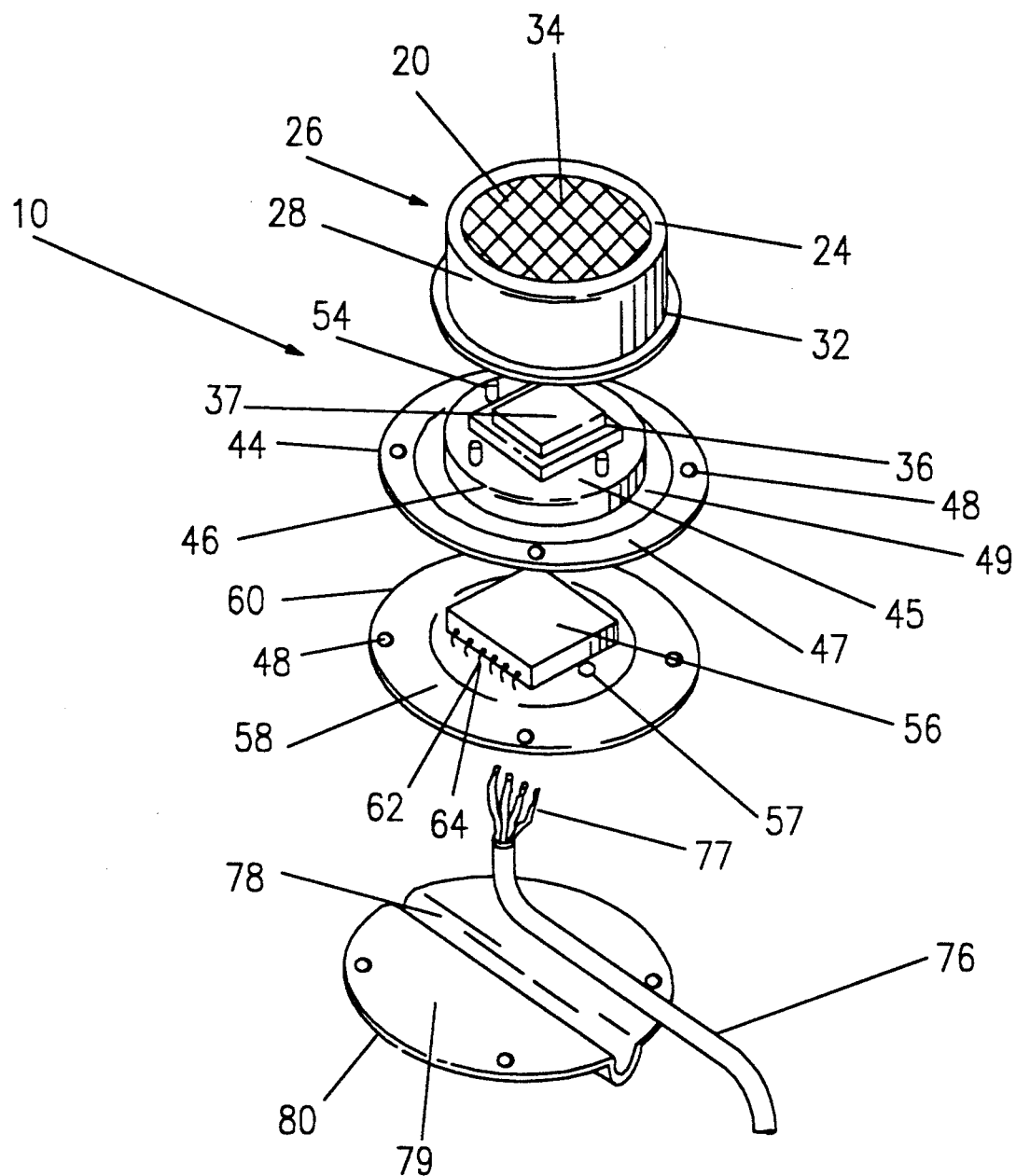
FIG. 1 is an exploded perspective view of the preferred embodiment of the pyroelectric detector assembly.

While the present invention is susceptible of various modifications and alternative constructions, the embodiment shown in the drawing is preferred and will be described in detail. It is to be understood, however, there is no intention to limit the invention to the particular from disclosed. On the contrary, the intention is to cover all modifications, equivalences and alternative constructions failing within the spirit and scope of the invention as expressed in the appended claims.

The advantages of simple, rugged construction and ease of precision assembly can be appreciated by referring to FIGS. 1 and 2 where there are illustrated, respectively, an exploded view of a pyroelectric detector assembly 10, and a section view of the front end of the assembly 10. A window 20 fabricated from germanium crystal and coated on a top surface 21 with an antireflection coating 22, is rigidly and symmetrically positioned by an annular top cover 24 of a metallic housing 26 extending downwardly in a cylindrical shell 28 terminating in a flange 32. A milled chemically etched gridded EMI shield 34, substantially transmissive to long-wave infrared radiation, is proximate to the window 20 and contacts the shell 28.

As illustrated in FIG. 3, a thin film pyroelectric detector element 36 with a top surface 37 coated with black gold including a conductive contact 38 to which is soldered an insulated wire 39 and a bottom surface 41 including a conductive contact 42 to which is soldered an insulated wire 43, is cemented to a ceramic substrate 44 cemented to the top surface 45 of a disc-shaped metallic mount 46 including a flange 47 having a plurality of symmetrically disposed rivet holes 48 and an annular milled depression 49. The diameter of the depression 49 is slightly larger than that of the flange 32, so that when the PDA is assembled, the flange 32 is closely received by the depression 49. The wires 39 and 43 are each connected to a glass-to-metal seal electronic feedthrough 54 extending upward from the periphery of the surface 45.

As illustrated in FIGS. 1 and 3, an ultra low noise charge coupled hybridized preamplifier package 56 is disposed within a circular cut-out 57 of a top surface 58 of a circular mounting plate 60, exposing a circular portion of a printed circuit board 61. The plate 60 has a plurality of symmetrically disposed circumferential rivet holes 48. A plurality of insulated leads 62 from the preamplifier package 56 extend through a corresponding plurality of holes 64 in the board 61.

As also illustrated in FIG. 3, a postamplifier package 66 including a threshold circuit 67 and a plurality of electronic filtering circuits 68, and a plurality of electrically insulated contact pins 69 are attached to the printed circuit board 61 which is fixed to a bottom surface 72 of the plate 60. The leads 62 are attached individually to the pins 69.

Referring again to FIG. 1, a shielded cable 76 which carries power to and signals from the pyroelectric detector assembly 10 terminates at one end in a plurality of insulated wires 77 attached individually to the pins 69. The cable 76 is disposed within a channel 78 in the upper surface 79 of a metallic bottom plate 80. The bottom plate 80 is constructed from a material providing EMI shielding.

The metallic housing 26 is commercially available from Sinclair Manufacturing Company of Charity, Mass. and includes the chemically etched EMI shield 34 and a glass window which is replaced by the anti-reflection coated window 20.

The window 20 is one-inch in diameter and has a thickness of 0.025 inch. The anti-reflection coating of superimposed thin layers of zinc sulfide and thallium fluoride enables high transmittance around 10.6 $\mu$m.

The thin film detector element 36 is fabricated from single crystal lithium tantalate (LiTaO$_3$) and is available commercially from Laser Precision Corporation of Utica, N.Y. as Part No. KT-1525. The detector element 36 is ground and polished to a disc of 25 $\mu$m thickness with an active area of 1 cm$^2$. The detector element 36 is coated with a broad band absorbing layer of black gold which increases detection sensitivity by a factor of two.

LiTaO$_3$ operates very well over the expected temperature range of training devices ($-23°$ C. to 62° C.), and is stable to several hundred degrees centigrade. In contrast, polyvinylidene fluoride (PVDF) plastic pyroelectric detectors are destroyed at about 80° C.

The circuitry in the preamplifier package 56 was designed specifically to optimize the performance of a LiTaO$_3$ detector, and is commercially available from Dawn Electronics, inc. of Carson City, Nev., as Part No. DN-620.

The postamplifier package 66, including the threshold circuit 67 and the filtering circuits 68, is also commercially available from Dawn Electronics, Inc. as Part No. DN-603.

What is claimed is:

1. An improved pyroelectric detector assembly for detecting infrared radiation of the type having a pyroelectric detector element, a preamplifier, a signal conditioner, and a postamplifier, wherein the improvement comprises:
    a thin film pyroelectric detector element coated with a layer of long wave infrared radiation absorbing material for detecting low intensity long wave infrared laser radiation at wavelengths about 10.6 $\mu$m;
    an ultra low noise charge coupled hybridized preamplifier; a signal conditioner; and
    postamplifier including a voltage comparator, a threshold adjustment, and a pulse generator.

2. The pyroelectric detector assembly of claim 1 further including an electromagnetic interference shield surrounding said detector element, said preamplifier, said signal conditioner and said postamplifier.

3. A system of detection of long-wave infrared laser radiation, said system comprising:
    radiation transmission means substantially transparent to long-wave infrared radiation;
    detection means for detecting low intensity long-wave infrared radiation;
    preamplification means for ultra low noise amplification of voltages output from said detection means;
    signal conditioning means for conditioning signals output from said preamplification means;
    postamplification means for amplification of signals output from said signal conditioning means;
    signal comparison means for comparing signals output from said postamplification means with a preset threshold;
    pulse generation means for emitting an electronic pulse when triggered by said signal comparison means;
    electromagnetic interference shielding means to shield said detection means, preamplification means, signal conditioning means, postamplification means, signal comparison means, and pulse generation means from electromagnetic radiation; and
    enclosure means for protecting from the ambient environment and maintaining in precise alignment said detection means, preamplification means, signal conditioning means, postamplification means, signal comparison means, and pulse generation means.

4. The system of claim 3, wherein said radiation transmission means is a germanium window with an anti-reflection coating.

5. The system of claim 4, wherein the radiation transmissivity of said anti-reflection coated window is centered at 10.6 $\mu$m.

6. The system of claim 3, wherein said detection means is a thin film pyroelectric detector.

7. The system of claim 6, wherein said pyroelectric detector is fabricated from lithium tantalate (LiTaO$_3$).

8. The system of claim 3, wherein said preamplification means is an ultra low noise charge coupled hybridized preamplifier.

9. The system of claim 8, wherein said preamplifier is optimized with respect to the operating parameters of a lithium tantalate detector.

10. The system of claim 3, wherein said postamplification means is a postamplifier including a low pass filter, a voltage comparator, and a threshold adjustment.

11. The system of claim 3, wherein said electromagnetic interference shielding means comprise a milled chemically etched grid substantially transmissive to long-wave infrared radiation, a cylindrical shell impervious to radiofrequency radiation, and a back plate impervious to radiofrequency radiation.

12. A system for detection of long-wave infrared radiation, said system comprising:
    an anti-reflection coated germanium window substantially transparent to long-wave infrared radiation;
    a milled chemically etched EMI shield substantially transmissive to long-wave infrared radiation;
    a thin film pyroelectric detector element;
    an ultra low noise charge coupled hybridized preamplifier;
    electronic circuitry for conditioning the signals output from said preamplifier;
    a postamplifier including a low pass filter, a voltage comparator, threshold adjustment, and a pulse generator;
    an enclosure impervious to radiofrequency radiation, enclosing said window, gridded EMI shield, pyroelectric detector element, preamplifier, conditioning circuitry, and postamplifier; and
    a back plate impervious to radiofrequency radiation.

13. The system of claim 12, wherein the radiation transmissivity of said anti-reflection coated window is centered at 10.6 μm.

14. The system of claim 12, wherein said pyroelectric detector is fabricated from lithium tantalate.

15. The system of claim 14, wherein one planar surface of said pyroelectric element is coated with a layer of black gold.

16. The system of claim 12, wherein said hybridized preamplifier is optimized with respect to the operating parameters of a lithium tantalate detector.

17. A system for detection of long-wave infrared laser radiation, said system comprising:

an anti-reflection coated germanium window having a transmissivity maximum at around 10.6 μm, around one-inch in diameter and around 0.025 inch in thickness;

a chemically etched shield impervious to radiofrequency radiation and substantially transmissive to long-wave infrared radiation, in close proximity below said window;

a thin film detector element fabricated from lithium tantalate, in close proximity below said shield, around 25 μm in thickness and having an active area of around 1 cm$^2$, coated with a layer of black gold;

a preamplifier package which has the capability to amplify the current generated when radiation impinges on said detector element; and a postamplifier package which has the capability to filter and amplify the voltage signal generated by said preamplifier package.

* * * * *